UNITED STATES PATENT OFFICE.

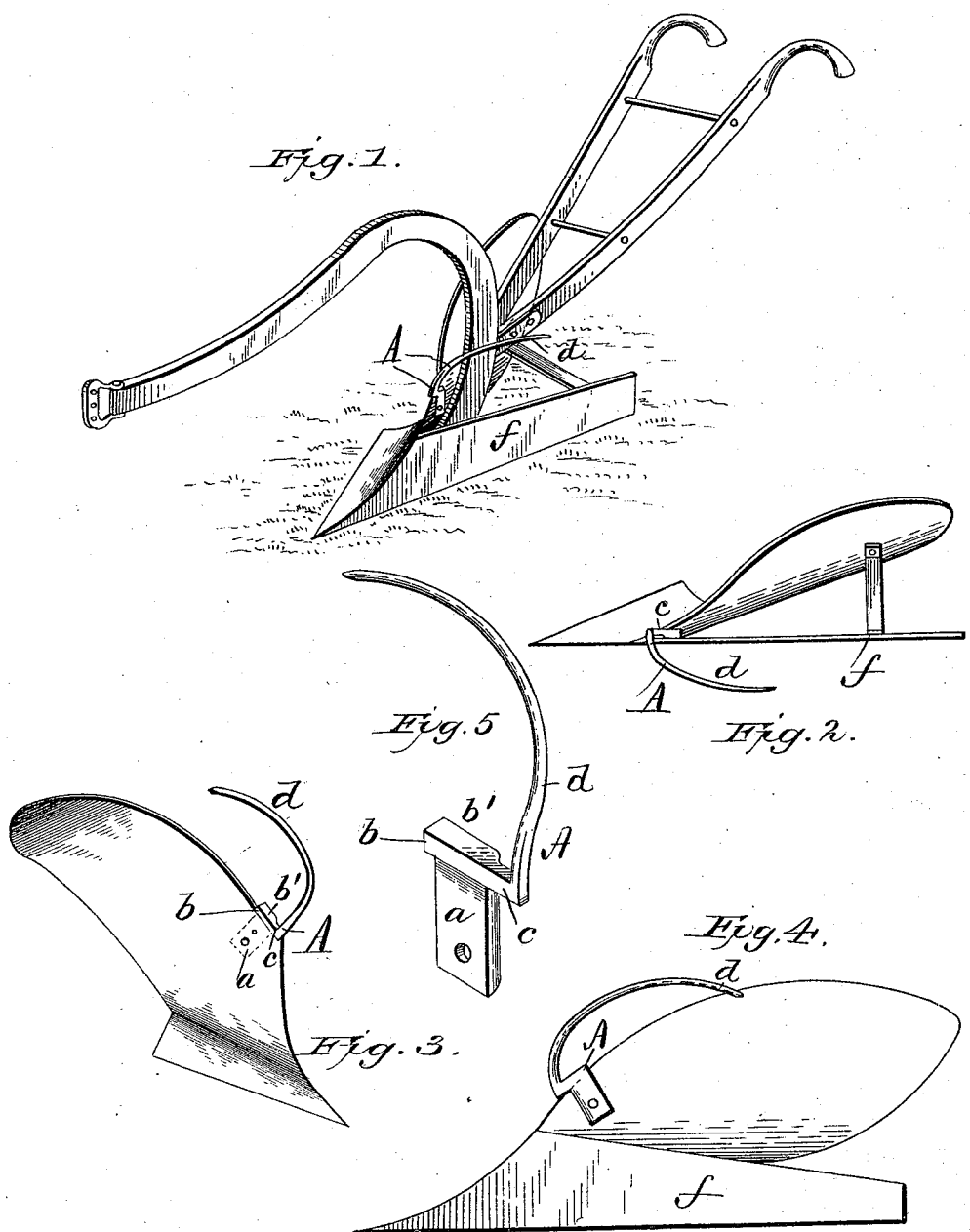

FREDERICK WOLKE, OF RICH PRAIRIE, MINNESOTA; ANGELA WOLKE ADMINISTRATRIX OF SAID FREDERICK WOLKE, DECEASED.

PLOW-CLEANER.

SPECIFICATION forming part of Letters Patent No. 490,420, dated January 24, 1893.

Application filed February 4, 1892. Serial No. 420,272. (No model.)

*To all whom it may concern:*

Be it known that I, FREDERICK WOLKE, a citizen of the United States, residing at Rich Prairie, in the county of Morrison and State of Minnesota, have invented certain new and useful Improvements in Plow-Cleaners; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to plow cleaners, and consists in the novel construction and arrangement of its parts hereinafter set forth in this specification and the claim hereto attached.

In the accompanying drawings: Figure 1, is a perspective view of a plow stock and plow with my invention attached. Fig. 2, is a top plan view of a plow with my invention attached. Fig. 3, is a view looking at the right hand side of a plow with my invention attached. Fig. 4, is a view looking at the left hand side of a plow with my invention attached. Fig. 5, is a perspective view of the cleaner with shank for securing it to the plow.

My invention is described as follows:

A, is the cleaner, mentioned as a whole.

$a$, is the shank having through it one or more perforations by means of which it may be secured to any plow.

$b$, is the cap which is just as thick as the front edge of an ordinary plow, and has an extended flange, $b'$, to which the said shank is connected. Said cap has an arm, $c$, extending forward and resting upon the front edge of the plow. From the front end of said arm rises a prong, $d$, extending upward, backward and to the left considerably of the land side, $f$, (see Fig. 2.) When the plow moves forward the refuse stuff on the soil, such as sticks, grass, roots, manure, and the like, is carried up over said prong to the left and deposited upon the ground on the side against which the land side, $f$, moves, so that the next furrow will turn said refuse stuff under.

A plow will not clog with my cleaner properly attached and adjusted thereto.

All the parts of said plow cleaner are integral.

Having described my invention what I claim as new and desire to secure by Letters Patent, is:—

In combination with a plow the cleaner A, consisting of the perforated shank $a$, cap $b$, flange $b'$, extending from said cap, arm $c$, extending forward from said cap, prong $d$, extending upward toward the landside and bending backward, substantially as shown and described.

In testimony whereof I affix my signature in presence of two witnesses.

FREDERICK WOLKE.

Witnesses:
FRANK ELLENBECKER,
SIMON P. BRICK.